Dec. 23, 1952         P. DIEBOLD        2,622,936
PNEUMATIC PLANT FOR HANDLING GRAINS
AND THE LIKE GRANULAR PRODUCTS
Filed May 17, 1947
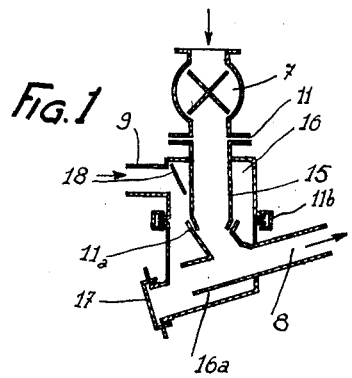
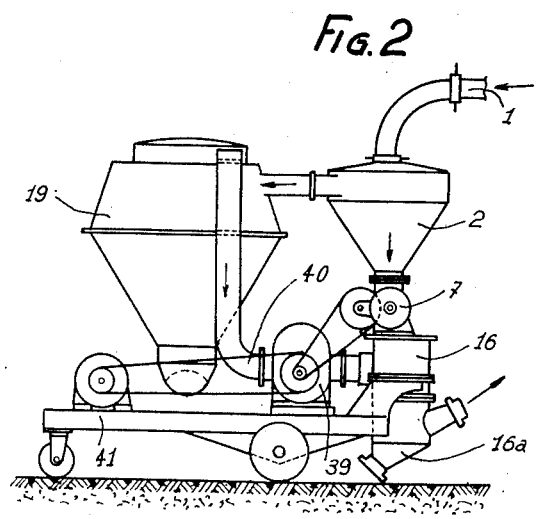
INVENTOR:
PIERRE DIEBOLD
BY:

Patented Dec. 23, 1952

2,622,936

UNITED STATES PATENT OFFICE 2,622,936

PNEUMATIC PLANT FOR HANDLING GRAINS AND THE LIKE GRANULAR PRODUCTS

Pierre Diebold, Nancy, France

Application May 17, 1947, Serial No. 748,832
In France July 12, 1944

Section 1, Public Law 690, August 8, 1946
Patent expires July 12, 1964

5 Claims. (Cl. 302—34)

The present invention has for its object improvements in pneumatic conveyors, more particularly of the kind known as grain pumps and in which pneumatic suction and pressure are used for conveying granular products. As a rule the pneumatic conveying of such products from one point to another by suction requires a system comprising a suction pipe extending from a feed hopper and leading to a receiver in which an intense partial vacuum is created by means of a vacuum pump, fan, or the like.

The receiver is as a rule a conical vessel to which the material conveyed is supplied through a tangential or oblique pipe, which allows a gradual reduction in the travelling speed of the products that are being conveyed so as to allow their dropping by gravity into the discharging means.

It is difficult with such an arrangement to change the position of the supply pipe, particularly in portable conveyors.

To remove this drawback, according to the invention I provide means whereby the position of the suction pipe with reference to the receiver can be changed in accordance with the requirements of each case.

The present invention mainly consists of a pneumatic device for conveying granular materials and in which there is provided a chamber through which the granular material is adapted to pass, this chamber being made of two parts. A first joint means interconnects these parts of the chamber to permit rotation of one of the parts of the chamber through 360° with respect to the other of the parts of the chamber. A fluid supply conduit is connected to and communicates with the other of the said parts of the chamber for supplying pneumatic fluid to said chamber. A discharge conduit means is connected to and communicates with the said one of the parts of the chamber for conveying the pneumatic fluid together with the granular material carried by the same from the chamber, this discharge conduit means extending for a substantial distance into said chamber. An inlet conduit is connected to and communicates with the other of the said parts of the chamber for delivering granular material thereto, this inlet conduit being mounted coaxially with the axis of rotation of the said one chamber part and the inlet conduit extending for a substantial distance into the chamber. Finally, a second joint means interconnects the inlet conduit and discharge conduit means within the chamber so that they are in communication with each other and so that the discharge conduit means may turn through 360° with respect to the inlet conduit, this second joint means being concentrically arranged with respect to the first joint means, whereby the said one part of said chamber and the discharge conduit means connected thereto may be turned through 360° with respect to the said other part of the chamber and the inlet conduit connected thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which Fig. 1 is a vertical, sectional view through one embodiment of an apparatus constructed in accordance with the present invention; and Fig. 2 is a diagrammatic elevational view of an entire organization with which the structure of Fig. 1 is associated.

Referring now to the drawings, there is shown in Fig. 2 an apparatus provided with a receiver 2 where the granular material arrives from conduit 1, and it passes through the feed means 7, shown in Figs. 1 and 2. Below the feed means 7 there is located the system 16 and 16a which, with its associated structure, forms the principal part of the invention. The fan means 39 draws air through the filter 19 and delivers it through the pipe 9 to the chamber 16. The extreme flexibility of the device which is provided by the adjustable parts thereof is disclosed in Fig. 1 where the discharge conduit 8, which is rotatably mounted with respect to the delivery conduit 15 by the joint means 11a, is enclosed at one end portion thereof within the chamber 16. The chamber 16 comprises the two parts 16 and 16a which are rotatably mounted with respect to each other by the joint means 11b, which is concentrically located with respect to the joint means 11a. In this way, the discharge conduit 8 may turn through 360° to any desired position. It will also be noted that by the joint 11 of Fig. 1 the entire system or only the upper part thereof may be rotated through 360° with respect to the feed means 7, whereby the pneumatic fluid supply conduit 9 may be turned to receive the pneumatic fluid from any location. Cap 17 may be removed for inspection of chamber part 16a. A non-return valve 18 is associated with pipe 9 to automatically close the same when fan 39 stops, to prevent compressed air in the chamber 16 from expanding back through pipe 9.

It will be understood that each of the elements described above, or two or more together, may also find a useful application in other types of pneumatic conveyors differing from the types described above.

While the invention has been illustrated and described as embodied in pneumatic conveyors for granular materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a pneumatic device for conveying granular materials, in combination, a chamber through which the granular material is adapted to pass, said chamber being made of two parts; first joint means interconnecting said parts of said chamber for permitting rotation of one of said parts of said chamber through 360° with respect to the other of said parts of said chamber; a fluid supply conduit connected to and communicating with the other of said parts of said chamber for supplying pneumatic fluid to said chamber; discharge conduit means connected to and communicating with said one of said parts of said chamber for conveying the pneumatic fluid together with the granular material carried by the same from said chamber, said discharge conduit means extending for a substantial distance into said chamber; an inlet conduit connected to and communicating with the other of said parts of said chamber for delivering granular material thereto, said inlet conduit being mounted coaxially with the axis of rotation of said one chamber part and said inlet conduit extending for a substantial distance into said chamber; and second joint means interconnecting said inlet conduit and discharge conduit means within said chamber so that they are in communication with each other and so that said discharge conduit means may turn through 360° with respect to said inlet conduit, said second joint means being concentrically arranged with respect to said first joint means, whereby said one part of said chamber and said discharge conduit means connected thereto may be turned through 360° with respect to said other part of said chamber and said inlet conduit connected thereto.

2. In a pneumatic device for conveying granular materials, in combination, a chamber through which the granular materials and pneumatic fluid are adapted to pass, said chamber comprising two parts; first joint means interconnecting said two parts of said chamber so that one of the parts thereof may be rotated through 360° with respect to the other of the parts thereof; means for delivering granular materials to said chamber comprising a delivery conduit connected to and communicating with said other part of said chamber; feed means for supplying granular material to said delivery conduit; second joint means interconnecting said feed means and said delivery conduit for permitting said delivery conduit and said feed means to be rotated through 360° with respect to each other, said second joint means being concentrically located with respect to said first joint means; means for supplying pneumatic fluid to said chamber comprising a conduit connected to and communicating with said other part of said chamber; and discharge conduit means connected to and communicating with said one part of said chamber for receiving the granular material and pneumatic fluid from said chamber, whereby said conduit means may be positioned so as to direct the granular material conveyed from said chamber in any desired direction.

3. In a pneumatic device for conveying granular materials, in combination, a chamber through which the granular materials and pneumatic fluid are adapted to pass, said chamber comprising two parts; first joint means interconnecting said two parts of said chamber so that one of the parts thereof may be rotated through 360° with respect to the other of the parts thereof; means for delivering granular materials to said chamber comprising a delivery conduit connected to and communicating with said other part of said chamber and extending for a substantial distance into said chamber; feed means for supplying granular material to said delivery conduit; second joint means interconnecting said feed means and said delivery conduit for permitting said delivery conduit and said feed means to be rotated through 360° with respect to each other, said second joint means being concentrically located with respect to said first joint means; means for supplying pneumatic fluid to said chamber comprising a conduit connected to and communicating with said other part of said chamber; discharge conduit means connected to and communicating with said one part of said chamber and extending for a substantial distance into said chamber for receiving the granular material and pneumatic fluid from said chamber, whereby said conduit means may be positioned so as to direct the granular material conveyed from said chamber in any desired direction; and third joint means for interconnecting said delivery conduit and said discharge conduit means within said chamber so as to permit said discharge conduit means and said delivery conduit to be rotated through 360° with respect to each other, said third joint means being located concentrically with respect to said first and second joint means, whereby said discharge conduit means and said one part of said chamber connected thereto may be rotated through 360° with respect to said other part of said chamber and said delivery conduit.

4. In a pneumatic device for conveying granular materials, in combination, a chamber through which the granular materials and pneumatic fluid are adapted to pass, said chamber comprising two parts; first joint means interconnecting said two parts of said chamber so that one of the parts thereof may be rotated through 360° with respect to the other of the parts thereof; means for delivering granular materials to said chamber comprising a delivery conduit connected to and communicating with said other part of said chamber and extending for a substantial distance into said chamber; feed means for supplying granular material to said delivery conduit; second joint means interconnecting said feed means and said delivery conduit for permitting said delivery conduit and said feed means to be rotated through 360° with respect to each other, said second joint means being concentrically located with respect to said first joint means; means for supplying pneumatic fluid to said chamber comprising a conduit connected to and communicating with said other part of said chamber; discharge conduit means connected to and communicating with said one part of said chamber and extending for a substantial distance into said chamber for receiving the granular material and pneumatic fluid from said chamber, whereby said conduit means may be positioned so as to direct the granular material conveyed from said chamber in any desired direction, said discharge conduit means being provided with an open end portion in said chamber for receiving the pneumatic fluid from said fluid supply means, whereby said pneumatic fluid in said discharge conduit means carries the granular material delivered to said discharge conduit by said delivery conduit along said discharge conduit and out of said chamber; and third joint means for interconnecting said delivery conduit and said discharge conduit means within said chamber so as to permit said discharge conduit means and said delivery conduit to be rotated through 360° with respect to each other, said third joint means being located concentrically with respect to said first and second joint means, whereby said discharge conduit means and said one part of said chamber connected thereto may be rotated through 360° with respect to said other part of said chamber and said delivery conduit.

5. In a pneumatic device for conveying granular materials, in combination, a chamber through which the granular materials and pneumatic fluid are adapted to pass, said chamber comprising two parts and being formed with an opening in an outer surface portion thereof; detachable cover means for closing said opening of said chamber whereby said chamber may be opened for cleaning purposes by removing said cover means; first joint means interconnecting said two parts of said chamber so that one of the parts thereof may be rotated through 360° with respect to the other of the parts thereof; means for delivering granular materials to said chamber comprising a delivery conduit connected to and communicating with said other part of said chamber and extending for a substantial distance into said chamber; feed means for supplying granular material to said delivery conduit; second joint means interconnecting said feed means and said delivery conduit for permitting said delivery conduit and said feed means to be rotated through 360° with respect to each other, said second joint means being concentrically located with respect to said first joint means; means for supplying pneumatic fluid to said chamber comprising a conduit connected to and communicating with said other part of said chamber; discharge conduit means connected to and communicating with said one part of said chamber and extending for a substantial distance into said chamber for receiving the granular material and pneumatic fluid from said chamber, whereby said conduit means may be positioned so as to direct the granular material conveyed from said chamber in any desired direction, said discharge conduit means being provided with an open end portion in said chamber for receiving the pneumatic fluid from said fluid supply means, whereby said pneumatic fluid in said discharge conduit means carries the granular material delivered to said discharge conduit by said delivery conduit along said discharge conduit and out of said chamber; and third joint means for interconnecting said delivery conduit and said discharge conduit means within said chamber so as to permit said discharge conduit means and said delivery conduit to be rotated through 360° with respect to each other, said third joint means being located concentrically with respect to said first and second joint means, whereby said discharge conduit means and said one part of said chamber connected thereto may be rotated through 360° with respect to said other part of said chamber and said delivery conduit.

PIERRE DIEBOLD.

REFERENCES CITED

The following references are of record in the file of this patent:

UNITED STATES PATENTS

| Number | Name | Date |
|---|---|---|
| 585,804 | Weber | July 6, 1897 |
| 1,169,745 | Haddon | Jan. 25, 1916 |
| 1,600,762 | Hawley | Sept. 21, 1926 |
| 1,880,452 | Hulslander | Oct. 4, 1932 |
| 2,250,285 | White | July 22, 1941 |
| 2,289,596 | Seamons | July 14, 1942 |
| 2,472,030 | Thulin | May 31, 1949 |

FOREIGN PATENTS

| Number | Country | Date |
|---|---|---|
| 316,988 | Germany | June 7, 1916 |